(12) United States Patent
Goslin et al.

(10) Patent No.: US 9,675,888 B2
(45) Date of Patent: Jun. 13, 2017

(54) STORYTELLING ENVIRONMENT: ALTERING GAMEPLAY BASED ON BATTERY LIFE

(71) Applicant: Disney Enterprises, Inc., Burbank, CA (US)

(72) Inventors: Michael P. Goslin, Sherman Oaks, CA (US); Eric C. Haseltine, Silver Spring, MD (US); Joseph L. Olson, Los Angeles, CA (US); Robert N. Carter, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 302 days.

(21) Appl. No.: 14/619,893

(22) Filed: Feb. 11, 2015

(65) Prior Publication Data

US 2015/0224400 A1    Aug. 13, 2015

Related U.S. Application Data

(60) Provisional application No. 61/938,651, filed on Feb. 11, 2014.

(51) Int. Cl.

| | |
|---|---|
| *A63F 13/65* | (2014.01) |
| *A63F 13/497* | (2014.01) |
| *A63F 13/92* | (2014.01) |
| *A63F 13/47* | (2014.01) |
| *A63F 13/98* | (2014.01) |
| *A63F 13/95* | (2014.01) |
| *A63H 3/00* | (2006.01) |

(52) U.S. Cl.
CPC .............. *A63F 13/65* (2014.09); *A63F 13/47* (2014.09); *A63F 13/497* (2014.09); *A63F 13/92* (2014.09); *A63F 13/95* (2014.09); *A63F 13/98* (2014.09); *A63H 3/003* (2013.01); *A63H 2200/00* (2013.01)

(58) Field of Classification Search
CPC ........ A63F 13/65; A63F 13/47; A63F 13/497; A63F 13/92; A63F 13/95; A63F 13/98; A63H 3/003
See application file for complete search history.

(56) References Cited

U.S. PATENT DOCUMENTS

| | | | |
|---|---|---|---|
| 2007/0066395 A1* | 3/2007 | Harris | ..................... A63F 13/10 463/39 |
| 2014/0096062 A1* | 4/2014 | Luu | ........................ G06Q 50/01 715/774 |
| 2015/0079573 A1* | 3/2015 | Haseltine | .......... G06F 17/30398 434/319 |

* cited by examiner

*Primary Examiner* — Corbett B Coburn
(74) *Attorney, Agent, or Firm* — Patterson + Sheridan, LLP

(57) ABSTRACT

Embodiments provide techniques for modifying story playback based on battery charge levels. A story that includes a plurality of actions and, for each of the plurality of actions, stimulus criteria indicating when the respective action is to be performed, is retrieved for playback. Embodiments determine a plurality of available storytelling devices for use in playback of the story and assign each of the plurality of actions within the story to a respective one or more of the plurality of available storytelling devices, based at least in part on a respective indication of battery charge for the respective storytelling device. Playback of the story is then initiated using, for each of the plurality of actions, the assigned one or more available storytelling devices to perform the respective action, responsive to a determination that the corresponding stimulus criteria is satisfied.

20 Claims, 7 Drawing Sheets

STORYTELLING ENVIRONMENT: ALTERING GAMEPLAY BASED ON BATTERY LIFE

CROSS-REFERENCE TO RELATED APPLICATIONS

This application claims benefit of U.S. provisional patent application Ser. No. 61/938,651, filed Feb. 11, 2014, which is herein incorporated by reference in its entirety.

BACKGROUND

Field of the Invention

The present invention generally relates to home entertainment, and more specifically to techniques for altering story playback in an immersive playtime environment based on device battery levels.

Description of the Related Art

Computer graphics technology has come a long way since video games were first developed. Relatively inexpensive 3D graphics engines now provide nearly photo-realistic interactive game play on hand-held video game, home video game and personal computer hardware platforms costing only a few hundred dollars. These video game systems typically include a hand-held controller, game controller, or, in the case of a hand-held video game platform, an integrated controller. A user interacts with the controller to send commands or other instructions to the video game system to control a video game or other simulation. For example, the controller may include a joystick and buttons operated by the user.

While video games allow the user to interact directly with the video game system, such interactions primarily influence the graphical depiction shown on the video game device (or on a connected display), and rarely influence any other objects outside of the virtual world. That is, a user may specify an input to the video game system, indicating that the user's avatar should perform a jump action, and in response the video game system could display the user's avatar jumping. However, such interactions are typically limited to the virtual world, and any interactions outside the virtual world are limited (e.g., a hand-held gaming device could vibrate when certain actions occur).

While significant advancements have been in made in battery technology, battery capacity remains limited. That is, while modern battery devices are capable of storing more energy for longer periods of time, even these improved devices eventually require recharging. In the context of devices that are used to create a immersive user experience, such battery limitations can be disruptive, as the need to recharge a device interrupts the storytelling experience and brings the user back to reality by reminding the user that the device is merely an electronic device (e.g., as opposed to a fictional character the device represents).

SUMMARY

One embodiment provides a non-transitory computer-readable medium containing computer program code, that, when executed, performs an operation. The operation includes retrieving a story for playback. The story includes a plurality of actions and, for each of the plurality of actions, stimulus criteria indicating when the respective action is to be performed. The operation also includes determining a plurality of available storytelling devices for use in playback of the story. Additionally, the operation includes assigning each of the plurality of actions within the story to a respective one or more of the plurality of available storytelling devices, based at least in part on a respective indication of battery charge for the respective storytelling device. The operation further includes initiating playback of the story using, for each of the plurality of actions, the assigned one or more available storytelling devices to perform the respective action, responsive to a determination that the corresponding stimulus criteria is satisfied.

Another embodiment provides a storytelling device that includes a processor and a memory containing an audio effect and a program that, when executed by the processor, performs an operation. The operation includes retrieving a story for playback. The story includes a plurality of actions and, for each of the plurality of actions, stimulus criteria indicating when the respective action is to be performed. The operation also includes determining a plurality of available storytelling devices for use in playback of the story. Additionally, the operation includes assigning each of the plurality of actions within the story to a respective one or more of the plurality of available storytelling devices, based at least in part on a respective indication of battery charge for the respective storytelling device. The operation further includes initiating playback of the story using, for each of the plurality of actions, the assigned one or more available storytelling devices to perform the respective action, responsive to a determination that the corresponding stimulus criteria is satisfied.

Still another embodiment provides a method that includes retrieving a story for playback. The story includes a plurality of actions and, for each of the plurality of actions, stimulus criteria indicating when the respective action is to be performed. The method also includes determining a plurality of available storytelling devices for use in playback of the story. Additionally, the method includes assigning each of the plurality of actions within the story to a respective one or more of the plurality of available storytelling devices, based at least in part on a respective indication of battery charge for the respective storytelling device. The method further includes initiating playback of the story using, for each of the plurality of actions, the assigned one or more available storytelling devices to perform the respective action, responsive to a determination that the corresponding stimulus criteria is satisfied.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
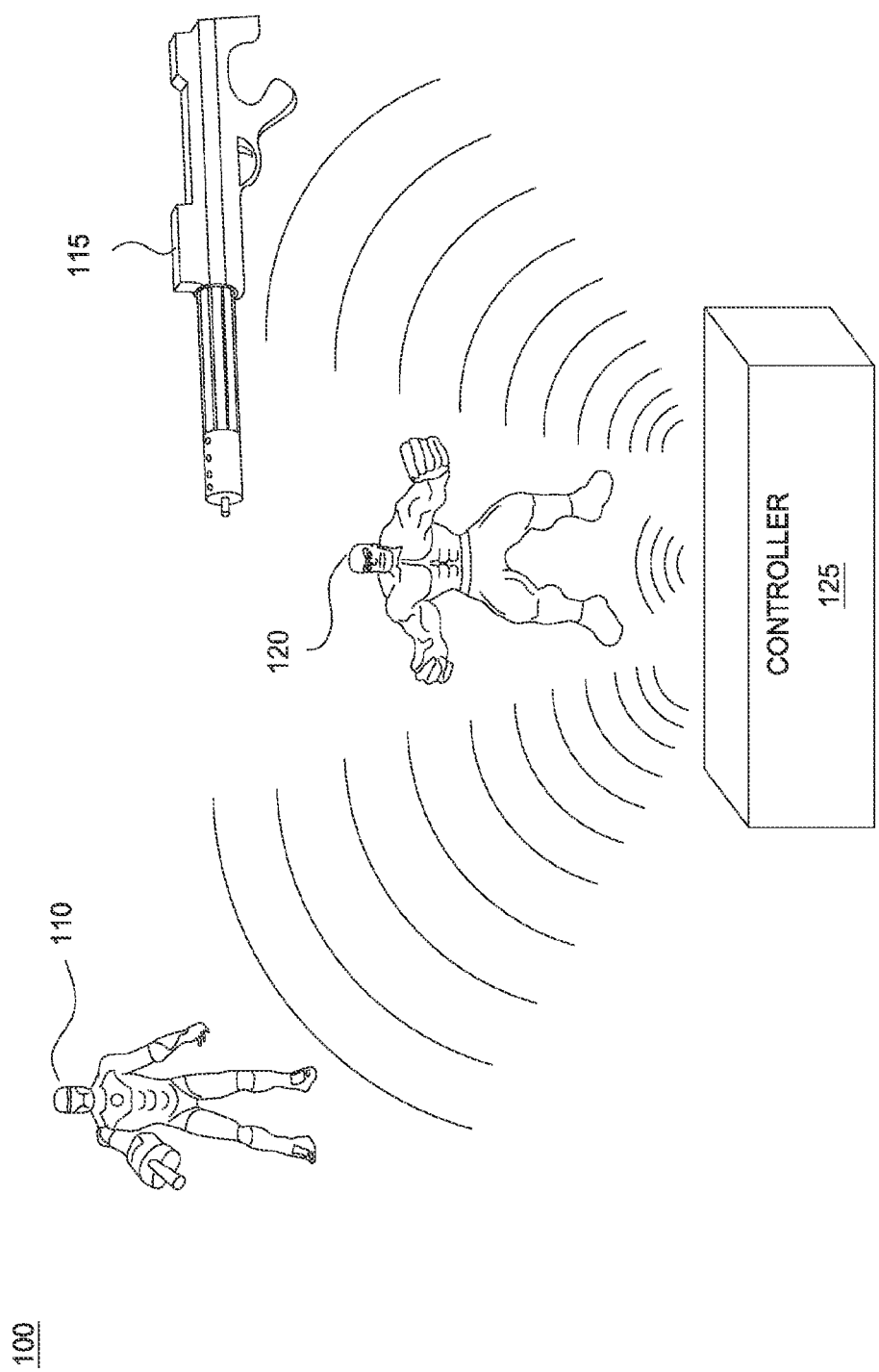
FIG. 1 illustrates a playtime environment in which a controller is instructing interactive devices, according to one embodiment described herein.

Generally, embodiments presented herein relate to the playback of a story in an immersive storytelling environment using storytelling devices (also referred to as interactive devices). More specifically, embodiments may use various storytelling devices, each capable of producing some auditory and/or visual effect, to create an immersive and interactive storytelling experience for a user. Such a system may include a variety of storytelling devices and a controller, connected via a network (e.g., an RF communications network). Each storytelling device generally represents any device capable of enhancing a storytelling experience, in response to user input (or some stimuli) a current context of a story. For instance, the controller device could configure the storytelling devices with stimulus and response information, based on a current context of a story. As an example, the controller device could configure a particular storytelling device to generate audiovisual messages responsive to a certain stimulus event (e.g., a user performing a particular action), and to perform another action responsive to other stimulus (e.g., the user not performing the particular action within a predefined window of time). The controller may be one of the storytelling devices, or the controller could be a standalone device (e.g., a computing device executing a control application).

Generally, each of the storytelling devices can have different capabilities in terms of battery life and current battery charge. As a result, even though a user may wish to play out a certain story in a particular fashion, a particular device could lack the battery charge to play out the story (e.g., if the user has not charged the particular device recently, if the particular device is heavily used within the story, etc.).

As such, embodiments can tailor the storytelling experience such that that power consumption is optimized across all of the storytelling devices used to play out the story. For instance, embodiments could configure the storytelling devices so that a first device performs a first action in lieu of a second device, in order to conserve battery power on the second device. As another example, embodiments could further configure the storytelling devices such that a third device performs a modified action (e.g., a shorter dialogue option) as opposed to a default action (e.g., a longer dialogue option) in order to conserve power on the third device. As yet another example, embodiments could cause one of the devices to perform a contextually appropriate action in the context of the story that causes the user to begin charging the device (e.g., a doll requesting to be placed within a cradle during the story, where the cradle acts as a charging device for the doll's battery). By dynamically adjusting the playback of the story and the contributions of the individual devices to the story, embodiments can optimize power usage across all of the devices used to playback the story.

Moreover, embodiments can control the available storytelling devices to cause the devices to work in unison, in order to compensate for each others' weaknesses. For example, a particular device may be unable to perform a certain action as part of a story due to insufficient battery charge, while another device may be fully charged and capable of performing the certain action. As such, embodiments could dynamically adjust the story so that the other device performs the action in place of the particular device.

An example will now be discussed with respect to FIG. 1, which illustrates a playtime environment in which a controller is instructing interactive devices to perform an effect, according to one embodiment described herein. As shown, the system 100 includes an Iron Man® action figure 110, a Star Wars® blaster rifle 115, a Hulk® action figure 120, and a controller device 125. Here, the toys 110, 115 and 120 are generally capable of producing audiovisual effects (e.g., audio output, light effects, movement effects such as vibration, etc.). In one embodiment, the toys 110, 115 and 120 may be configured with an action disc device. Of note, while various examples are discussed herein with respect to the toy devices 110, 115 and 120, it is broadly contemplated that these techniques can be utilized with any number of devices and any types of devices, consistent with the functionality described herein.

However, while the toys 110, 115 and 120 are capable of producing audiovisual effects, the toys 110, 115 and 120 may not be configured with logic to determine when conditions in the physical environment indicate a particular effect should be performed. This may be due to, in part, the cost and complexity of configuring each toy 110, 115 and 120 with the logic and hardware resources to detect stimuli in the physical environment and to perform a contextually appropriate audiovisual effect in response synchronously with other devices. As such, the toys 110, 115 and 120 could be configured to receive commands (e.g., from controller 125) and to perform an audiovisual effect(s) responsive to the received commands. Doing so allows the toys 110, 115 and 120 to be produced much more economically, while maintaining the capability to perform audiovisual effect(s) as part of a storytelling or playtime experience.

For example, as part of a Star Wars® storytelling experience, the storyline could indicate that devices within the physical environment should play a particular sound effect when the user performs a predefined gesture to use the "force." As such, the controller 125 could monitor the user's behavior to detect when the user has performed the predefined gesture. For example, the controller 125 could use one or more camera devices (e.g., within the controller devices 125, within one or more of the toys 110, 115 and 120, etc.) to monitor the user's movement within the physical environment. As another example, the user could wear an article (e.g., a bracelet) configured with an accelerometer device and capable of reporting data describing the user's movement to the controller device 125.

Upon detecting the user has performed the predefined gesture, the controller 125 could broadcast a command to the toy devices 110, 115 and 120, instructing the toy devices 110, 115 and 120 to synchronously perform an audiovisual effect. Such a command could be broadcast, for example, via a radio-frequency transmitter, an infrared emitter, an ultrasound transmitter, and so on. More generally, any communications protocol may be used for the communication between the controller and the toy devices 110, 115 and 120, consistent with the functionality described herein.

The toy devices 110, 115 and 120 could then receive the command and could perform the specified audiovisual effect in synchrony. For example, in the event the command specifies to play a particular sound effect, each of the toy devices 110, 115 and 120 could output the particular sound effect in synchrony with the other toy devices, thereby creating an improved sensorial experience for the user, relative to any of the toy devices 110, 115 and 120 playing the sound effect individually. Here, the sound effect could be, e.g., a sampled sound effect or a function-generated sound effect. Moreover, as discussed above, by playing the sound effect synchronously with one another, the toy devices 110, 115 and 120 can compensate for each other's weaknesses (e.g., a particular toy device being capable of outputting sounds within a limited frequency range), thereby producing an improved sound effect and sensorial immersion for the user.

While any number of toy devices can be used, the sense of immersion experienced by the user generally scales with the number of devices performing audiovisual effects in synchrony. For example, the controller 125 could detect when the user pulls the trigger to fire the blaster gun 115, and in response, could broadcast a command to all of the toy devices 110, 115 and 120 to output the sound effect of the blast being fired. Additionally, the controller 125 could instruct the toy devices 110, 115 and 120 to perform additional audiovisual effects, such as flashing lights and movements, in response to the user firing the blaster. Doing so helps to overload the user's senses, thereby creating a more immersive and realistic playtime experience.

Generally, a variety of techniques may be used to configure the toy devices 110, 115 and 120 to synchronously output the audiovisual effect. In one embodiment, the toy devices 110, 115 and 120 could be configured to output the audiovisual effect immediately upon receiving the command from the controller 125. Such an embodiment may be preferable when the toy devices 110, 115 and 120 receive the command at substantially the same time and when the toy devices 110, 115 and 120 take substantially the same amount of time to process the command and to perform the corresponding audiovisual effect. As another example, each of the toy devices 110, 115 and 120 (as well as the controller 125) could maintain an internal clock whose time is synchronized to the internal clock of the other toy devices, and the command transmitted by the controller 125 could specify a time at which to perform the audiovisual effect. Generally, any technique suitable for use in synchronizing the internal clocks may be used, consistent with the present disclosure. Examples of such techniques include, without limitation, Network Time Protocol (NTP), Precision Time Protocol (PTP), Reference Broadcast Time Synchronization, and so on.

In one embodiment, upon determining that a particular storytelling device currently has less than a threshold amount of battery charge, the controller 125 could omit the particular storytelling device from the list of devices that are instructed to perform the specified audiovisual effect in synchrony. While this may result in a slightly less immersive audiovisual effect (i.e., relative to if the particular storytelling device also took part in performing the specified audiovisual effect), doing so provides an improved overall user experience by conserving the limited battery resources of the particular storytelling device, thereby allowing the particular storytelling device to participate in the storytelling experience longer.

In one embodiment, the controller 125 is configured to dynamically adapt the playback of the story so that power consumption is optimized across the device 110, 115 and 120. For example, assume that a user has been playing with the blaster device 115 and has depleted a majority of the device's 115 battery charge. If the user then requests to playback a particular story that involves the blaster device 115, the controller 125 could dynamically adjust the behavior of the blaster device 115 during the playback of the story to ensure the blaster device 115 has sufficient battery charge to complete the story. For example, the blaster device 115 may be capable of performing multiple effects when its trigger mechanism is depressed, with such effects including audio effects (e.g., emitting a sound effect through one or more speaker devices), visual effects (e.g., activating one or more light-emitting devices), haptic feedback (e.g., activating a vibration mechanism), and so on. Upon determining that the blaster device 115 has insufficient battery charge to complete the playback of the story with all of the effects enabled, the controller 125 could configure the blaster device 115 to only perform a subset of the effects (e.g., audio effects only) to ensure that the blaster device 115 will have sufficient battery charge to complete the story.

In a particular embodiment, a story can include a particular action that is to be performed by a certain class of device. For example, the story could include a particular dialogue option that is to be performed by a "Hero" class device. For purposes of this example, assume that the Iron Man® device 110 and the Hulk® device 120 are both "Hero" class devices. In assigning the particular action to one of the devices 110 and 120, the controller 125 can consider the current battery charge and capabilities of the devices 110 and 120. For example, if the controller 125 determines that the device 110 is running relatively low on battery charge while the device 120 has ample battery charge remaining to complete the story, the controller 125 could assign the particular "Hero" class action to the device 120, rather than the 110. By doing so, the controller 125 can dynamically alter the playback of the story so that power consumption is optimized across all of the devices being used.

Figure 2:
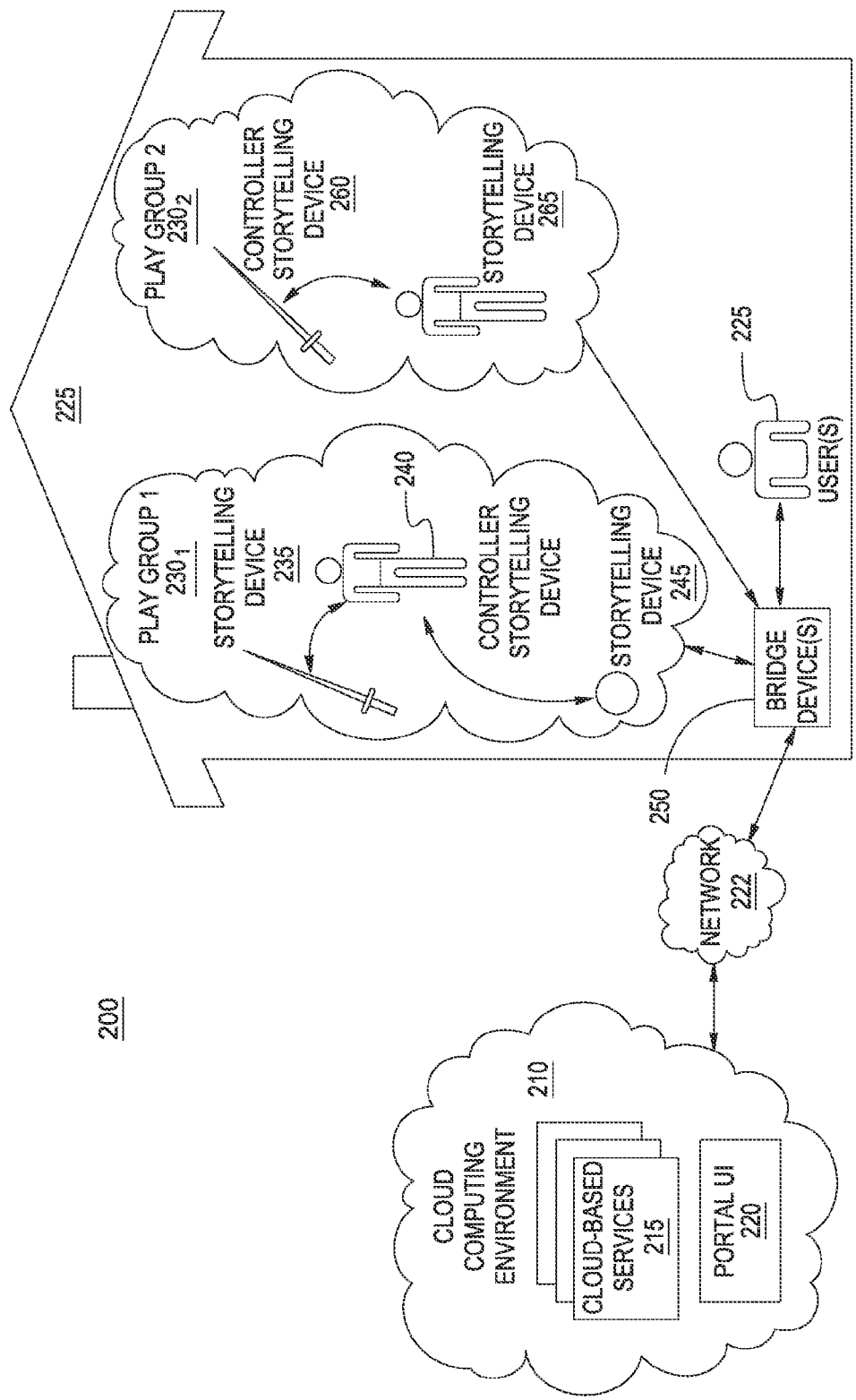
FIG. 2 illustrates a storytelling environment with a plurality of playgroups, according to one embodiment described herein.

FIG. 2 illustrates an example storytelling environment, according to one embodiment. As shown, the environment 200 includes a cloud computing environment 210 and a home environment 225, interconnected via network 222. The home environment 225 includes two playgroups 230$_{1-2}$ of storytelling devices, as well as a user(s) 255 and a bridge device(s) 250. Here, the user may connect to the bridge device 250 via an application (e.g., executing on a mobile device, rendered within a web browser, etc.). The cloud computing environment 210 hosts a plurality of services 215 and a portal user interface 220.

Generally, cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. Doing so allows a user to access information and the services 215 from any computing system attached to a network connected to the cloud (e.g., the Internet).

Each playgroup $230_{1-N}$ generally represents a set of storytelling devices involved in a unique storytelling or playtime experience. For instance, the playgroup $230_1$ represents a science fiction-themed storytelling experience and includes a light sword storytelling device 235, an action figure controller storytelling device 240, and a trainer storytelling device 245. Likewise, the playgroup $230_2$ also represents a science fiction-themed storytelling experience and includes a light sword controller storytelling device 260 and an action figure storytelling device 265. More generally, however, the playgroups may contain any number of storytelling devices of any number of different themes and types.

Generally, the playgroups 230 include storytelling devices within a particular physical location (e.g., a room of the house environment 225). That is, it may be preferable for a storytelling experience to only interact with storytelling devices within its immediate physical proximity (e.g., within the same room), as to do otherwise can potentially create security and other problems during the storytelling experience. A number of different techniques may be used to determine which storytelling devices are within immediate physical proximity of one another. For example, one or more of the storytelling devices could emit a first signal (e.g., an infrared signal) and the other storytelling devices could be configured to transmit a response (e.g., a radio frequency signal (RF)) upon receiving the first signal. The storytelling device(s) could then receive the responses from the other storytelling devices and could create a playgroup 230 that includes the other storytelling devices as well as the one or more storytelling devices.

Generally, it is advantageous for the first signal to be transmitted using a technique that does not readily pass through barriers such as the walls of a house (e.g., emitting infrared light), so as to detect only nearby storytelling devices that are within the same physical environment as the storytelling device. That is, while particular signals (e.g., RF signals) may be suited for inter-device communications, these signals may not be ideal for detecting nearby storytelling devices as they may readily permeate through barriers such as the walls of the house. Doing so helps to ensure that a storytelling experience will not make use of storytelling devices in different rooms of a residence or potentially within different residences altogether.

As shown, the devices 240 and 260 have been elected as controller devices within the playgroups $230_{1-2}$. Generally, a controller device configures each of the storytelling devices within a playgroup to perform certain actions in response to a detected stimulus event and a current context of the story being told. Since acting as a controller device may result in more processing and data transmissions operations, serving as the controller device may also consume more battery power. As such, when two or more devices capable of serving as the controller device are present within a playgroup 230, embodiments can consider the current battery charge and battery capabilities of the capable devices when selecting one of the devices to serve as the controller.

Here, the story may include a number of different contexts in a temporal order, and the playback of the story may advance from one context to the next until the last context is reached and the storytelling experience is complete. However, while the story may be linear in progression, this is not necessary. For example, a story could have different branches, where the story can proceed down one of many possible arcs. For instance, arcs could be randomly selected, selected based on a user's request (e.g., the user specifying which arc should be taken), selected based on the user's actions (e.g., the user manages to "rescue" one of the fictional characters in the story), selected based on the user's history of actions (e.g., whether the user is trending towards the "dark side" in a science fiction storyline), and so on. Moreover, the story may be modified dynamically during playback based on various actions, such as one of the storytelling devices becoming unavailable (e.g., losing power, leaving the physical environment, etc.) or a new storytelling device being introduced to the environment (e.g., the user's friend comes over to play, bringing one or more new storytelling devices with him).

Moreover, as discussed above, embodiments can dynamically alter the playback of the story based on the battery charge of the devices within a playgroup. For example, a story could contain multiple different storyline arcs, where each arc includes different actions that are performed by the storytelling devices and may require different actions on behalf of the user 255. If controller device 240 determines that storytelling device 245 has insufficient battery charge to perform the required actions specified by a first storyline arc, the controller device 240 could dynamically alter the story such that the storytelling device 245 has sufficient battery charge to complete the altered story. For instance, the controller device 240 could remove the first storyline arc from consideration, such that the first storyline arc cannot be selected until the storytelling device 245 has sufficient battery charge. Alternatively, the controller device 240 could dynamically alter the actions performed by the storytelling device 245 as part of the first storyline arc, such that the storytelling device 245 has sufficient power to perform the adjusted actions. For example, the controller device 240 could omit the storytelling device 245 from multi-device audiovisual effect (e.g., a sound effect played using multiple devices to create a more immersive user experience) in order to conserve the storytelling device's 245 battery power and to ensure the storytelling device 245 has sufficient power to perform its assigned actions.

As another example, embodiments can alter the playback of the story to incorporate the charging of a device's in a contextually appropriate manner. For example, upon determining that the Iron Man® action figure 110 lacks sufficient battery charge to complete the playback of current story, the controller device could configure the action figure 110 to instruct the user in a thematically appropriate manner to begin charging the device. For example, the Iron Man® action figure 110 could request that the user connect the action figure 110 to Jarvis (e.g., another toy device configured to recharge the action figure's 110 battery) in order to gather additional power reserves needed to complete the current mission. By doing so, embodiments ensure that the current story can continue playing until completion by altering the story in a thematically consistent manner.

Additionally, the controller may maintain state information and control game logic for the playgroup 230. For example, playgroup $230_1$ could be playing out a story in which a user is asked by the action figure device 240 to deflect virtual laser beams fired from the trainer device 245, using the light sword device 235. Here, the elected controller device (i.e., action figure 240) could maintain a "hit points" value for the user that is decremented when the user fails to deflect one of the virtual lasers, and could further maintain a count of how many virtual lasers the user has deflected thus far. Additionally, the controller could retrieve state data for the user (e.g., by querying one of the cloud-based services 215 with an identifier for the user) and could use the user state data to adjust the playback of the story.

In addition to detecting nearby storytelling device within the same physical environment, the storytelling devices within a playgroup 230 may elect one of the storytelling devices as a controller storytelling device. A number of different techniques may be used for such an election. For example, a user could explicitly specify that a particular one of the storytelling devices (e.g., the user's favorite device) should be used as the controller. Here, it may be preferable for the user to select a device that will remain with the user throughout the storytelling experience, so as to avoid a subsequent controller election part-way through the story. In one embodiment, the controller may be elected based on technical specifications and properties of the storytelling devices. For example, a storytelling device with a substantial amount of memory, processing power and communication bandwidth may be preferable as the controller, relative to a device having a lesser amount of computing resources.

As discussed above, the story may generally include stimulus events and corresponding actions, and may be linear in progression or dynamic (e.g., a story that includes different story arcs or branches). In one embodiment, the story may be defined such that each corresponding action is attribute to a type or role of storytelling device (i.e., as opposed to a specific storytelling device). In mapping the story to the available and compatible storytelling devices, the controller device 220 could determine a type of each of the storytelling devices, and could assign particular stimulus events and corresponding actions to each of the storytelling devices based on the determined type. For example, a particular story could state that an action should be performed by a storytelling device having the role of "Hero", and the controller could map the action onto a storytelling device within the playgroup having the role "Hero".

For instance, assuming that the storytelling device 240 represents a first fictional character action figure, the controller 240 could assign any stimulus events and actions within the story that are specific to the fictional character to the action figure 240. Likewise, if the story includes any stimulus events and actions designated for a hero-type character in the science fiction universe, the controller 240 could assign these stimulus events and the corresponding actions to the device 240 as well. In the event multiple storytelling devices are available that satisfy the criteria for a stimulus event/action combination (e.g., multiple hero devices are present and available within the playgroup), the controller 240 could select one of the storytelling devices to perform each of the stimulus event/action combinations. The controller could use a number of different techniques for mapping the actions to the compatible devices, including a random mapping algorithm, a load balancing algorithm (e.g., round robin), user preferences (e.g., assigning more actions to a device the user has identified as his favorite), explicit user instructions (e.g., allowing a user to customize the story, such as selecting which character will narrate the story), and so on. Advantageously, dynamically mapping the story onto the available and compatible devices allows the story to be used with various different storytelling devices and combinations of storytelling devices.

In one embodiment, the story may specify a distinct, contextually appropriate action to perform for various types of storytelling devices for a given stimulus event. That is, the controller could determine that a particular story includes a stimulus event designated for a hero character, and could specify a corresponding action designated for a action figure 240 and a separate, distinct action designated for an different hero character-based device. In such an embodiment, upon selecting one of the devices to respond to the stimulus event, the controller could assign the corresponding action to the device based on the device's type. Doing so helps to create a more immersive and realistic storytelling experience for the user, as the storytelling devices can be configured to react to stimulus events in a manner appropriate for the represented fictional character.

In mapping the actions to the various devices, the controller 240 can also consider the battery charge of each of the devices, so that power consumption is optimized across all of the devices within the playgroup for the playback of the current story. For instance, when mapping a particular action to one of multiple available hero devices within the playgroup, the controller 240 could also consider the current battery charge of each of the available hero devices, as well as a projected battery charge of the devices throughout the playback of the story. For example, the controller 240 could distribute the actions performed during the story across the available devices, such that all of the devices have sufficient battery charge to complete the playback of the story.

Once the controller maps the story onto the devices, the controller configures each of the storytelling devices with a number of stimulus events and corresponding effects relating to a first context of the story. As an example, the action figure 240 could detect when the user has successfully deflected a virtual laser fired from the storytelling device 245 (i.e., an occurrence of the stimulus event), and could audibly congratulate the user in response (i.e., performing the corresponding effect).

In configuring the devices to respond to stimulus events during the story, the controller device can consider the current battery charge of the devices as well as the projected battery charge at a future moment in time (e.g., at a particular point during playback of a story). If the controller determines that a particular device will not have sufficient power to perform the entirety of an assigned action during a story (e.g., audio, visual and haptic feedback), the controller could assign only a portion of the action to the device in response to the stimulus event. For instance, rather than lighting up, playing a sound effect and vibrating in response to the user deflecting a virtual laser beam during a story, the controller could configure the toy light sword device 235 to only perform audio and visual effects without any haptic feedback in order to conserve battery power.

Figure 3:
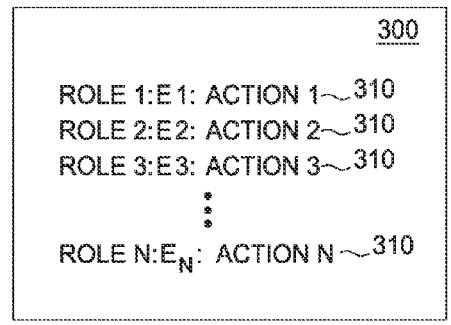
FIG. 3 illustrates a story, according to one embodiment described herein.

As discussed above, in addition to defining roles associated with each stimulus event, the story may also define a corresponding action to be performed in response to the stimulus event. For instance, the story could explicitly define dialogue to be audibly output by a device matching the defined role. In one embodiment, the story defines a class of action that should be performed by a storytelling device, in response to a corresponding stimulus event. An example of such an embodiment is shown in FIG. 3, which depicts a story 300 having a number of "role/event/action" sets. For example, the depicted story could play in linear order, where a device with "Role 1" performs "Action 1" in response to event "E1". Of course, the depicted story is without limitation and provided for illustrative purposes only, and it is broadly contemplated that other stories may be more dynamic, including a number of conditional branches and storyline arcs, multiple actions to be performed responsive to a particular stimulus event (all together, in the alternative, etc.) and so on.

In playing out the story 300, the controller could determine that two devices within the playgroup 230 have the role "Role 1", and could select one of the two devices to perform "Action 1" in response to detecting the event "E1". Here, "Action 1" may refer to a class of action, and the specific action performed may vary from one storytelling device to the next. For example, assume that the event "E1" is the user failing to deflect a virtual laser, fired from the device 245, using the lightsaber device 235. Here, the action "Action 1" could refer to a class of action generally designed to encourage the user to try again. However, each of the storytelling devices may potentially implement the action "Action 1" in a different way, depending on the character the device represents, the capabilities of the device (e.g., whether the device has movement capabilities, dialogue capabilities, etc.) and so on.

Figure 4A:
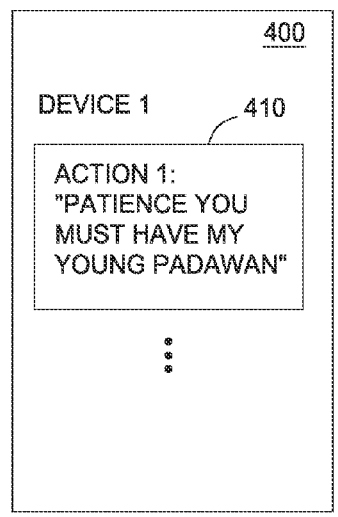
FIGS. 4A-B illustrate device configuration information for storytelling devices, according to one embodiment described herein.
Figure 4B:
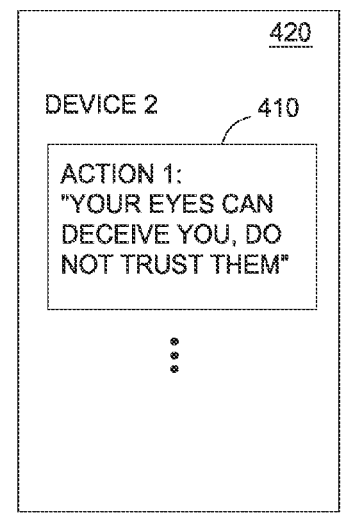

FIGS. 4A-B show an example of such a story. For purposes of this discussion, assume that the device 400 represents a storytelling device based on a first fictional character and that the device 420 represents a second storytelling device based on a second fictional character. Here, if the device 400 is selected to perform the action "Action 1" responsive to an occurrence of event "E1" (e.g., the user failing to deflect the virtual laser), the device 400 could output (e.g., using a text-to-speech synthesizer or a pre-recorded sound effect and one or more speaker devices) the dialogue 410 of "Patience you must have, my young padawan." Likewise, if the action "Action 1" is mapped to the device 420, the device 420 could output the dialogue 430 of "Your eyes can deceive you, do not trust them" in response to the user missing the virtual laser with the light sword device 235. Advantageously, by abstracting the devices' actions using a class of actions, embodiments enable content producers to create stories for a wide variety of devices, and enable device manufacturers to determine how individual devices will implement each class of actions.

Moreover, while each of the actions 410 and 430 includes only dialogue for output by the devices 400 and 420, respectively, it is contemplated that any number of different actions can be specified, and that such actions may be performed in whole, in the alternative, conditionally (e.g., a particular action may only be performed if a variable within the global state of the storytelling experience exceeds a threshold amount), and so on. For example, a controller within the playgroup could maintain state information which includes a "force level" value for the user which indicates the user's current strength with the force, based on the current storytelling experience and/or previous storytelling experiences. Upon detecting a particular stimulus event has occurred, one of the storytelling devices could be configured to select an appropriate action to perform from a specified class of actions, based on the user's force level. As an example, if the device determines the user has a low force level (e.g., indicating the user is relatively new to the science fiction-themed stories and has not "leveled up" yet by playing a substantial number of previous stories), the device could select an action corresponding to an inexperienced space adventurer (e.g., the action 410). On the other hand, if the device determines the user has a higher force level (e.g., indicating the user has completed a substantial number of science fiction-themed stories), the device could select an action within the class of actions that is contextually appropriate to a senior space adventurer. Advantageously, doing so allows the devices to perform actions that are contextually appropriate for a given user and a given storytelling experience.

In addition to state data characterizing the user, the storytelling devices may perform different events based on state data characterizing another one of the storytelling devices. For example, a particular action figure could appear loud and overbearing when in the presence of other storytelling devices having a low "force level", but could appear timid in the presence of storytelling devices having a high "force level." For instance, this may be achieved by the devices communicating their respective state data with each of the other devices, or could be orchestrated by a controller device collecting and aggregating each device's individual state data and configuring each of the devices accordingly.

Figure 5:
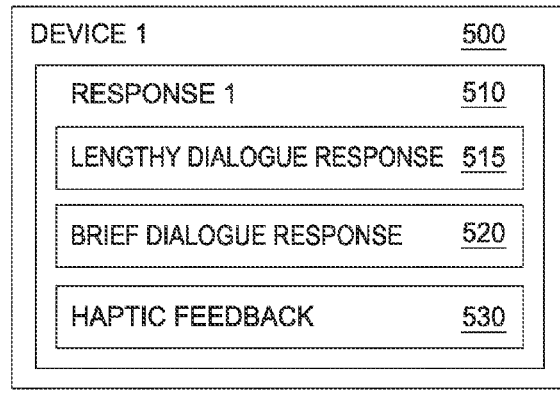
FIG. 5 illustrates an interactive device capable of performing multiple actions as part of a response within a story, according to one embodiment described herein.

Moreover, some storytelling devices can be configured to perform different variations of a particular action, in response to a given stimulus event. Such a configuration may be useful, for example, in determining the behavior of the devices during the playback of a story in order to optimize battery usage across all of the devices. An example of one such device is shown in FIG. 5, which illustrates an interactive device capable of performing multiple actions as part of a response within a story (e.g., actions performed responsive to a particular stimulus event(s)), according to one embodiment described herein. Here, the device 500 is capable of performing a response 510 to a particular stimulus event, where the response 510 includes one or more of a length dialogue response 515, a brief dialogue response 520 and haptic feedback 530.

When the device 500 is used during the playback of a story, a controller device managing playback of the story could determine a current battery charge of the device 500 and could select one or more of the actions 515, 520, 530 for the device 500 to perform based on the current battery charge. For instance, upon determining that the device 500 has a relatively low battery charge, the controller device could configure the device 500 to perform only the brief dialogue response 520 as the first response 510. On the other hand, if the controller determines the device 500 has a relatively full battery charge, the controller could configure the device 500 to perform the lengthy dialogue response 515 in addition to the haptic feedback 530. Advantageously, doing so allows the device 500 to behave in a different fashion depending on the device's 500 current battery charge.

Figure 6:
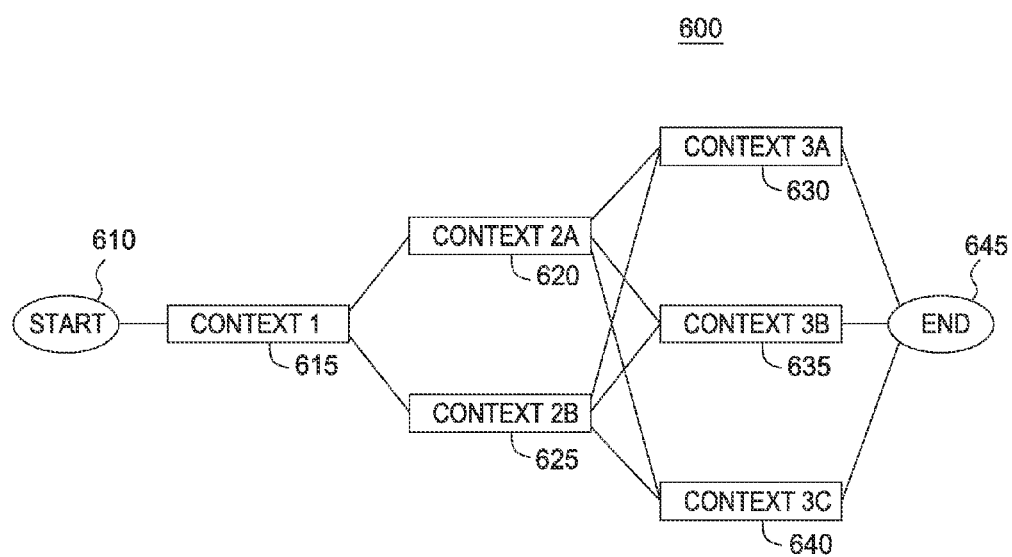
FIG. 6 illustrates a story containing multiple paths, according to one embodiment described herein.

FIG. 6 illustrates a story containing multiple paths, according to one embodiment described herein. As shown, the story 600 begins at block 610 and progresses to a first context 615. Generally, each of the contexts can include one or more stimulus events and one or more actions performed responsive to the stimulus events. Once the first context 615 is completed, the story 600 can progress to either the context 2A 620 or context 2B 625. In selecting one of the contexts, the controller component managing playback of the story 600 can consider the current battery charge of the storytelling devices involved in the playback of the story. For example, the controller component could determine that a particular storytelling device does not have sufficient battery charge to complete the context 2A 620 but does have sufficient battery charge to complete the context 2B 625. Accordingly, the controller component could select the context 2B 625 to advance the story.

The controller component could then consider the contexts 630, 635 and 640 in conjunction with the current battery charge of the various devices involved in the story. For example, the controller component could determine that a first device has insufficient battery charge to complete context 630, while a second device has insufficient battery charge to complete the context 640. However, the controller component could determine that all of the devices involved in the playback of the story have sufficient battery charge to complete the context 635, if a third device is configured to use a lower-power effect (e.g., a shorter dialogue option and no haptic feedback). Accordingly, the controller component could select the context 635 to advance the story, which then ends at block 645. Advantageously, doing so allows the playback of the story to dynamically adjust to the devices' current levels of battery charge.

Figure 7:
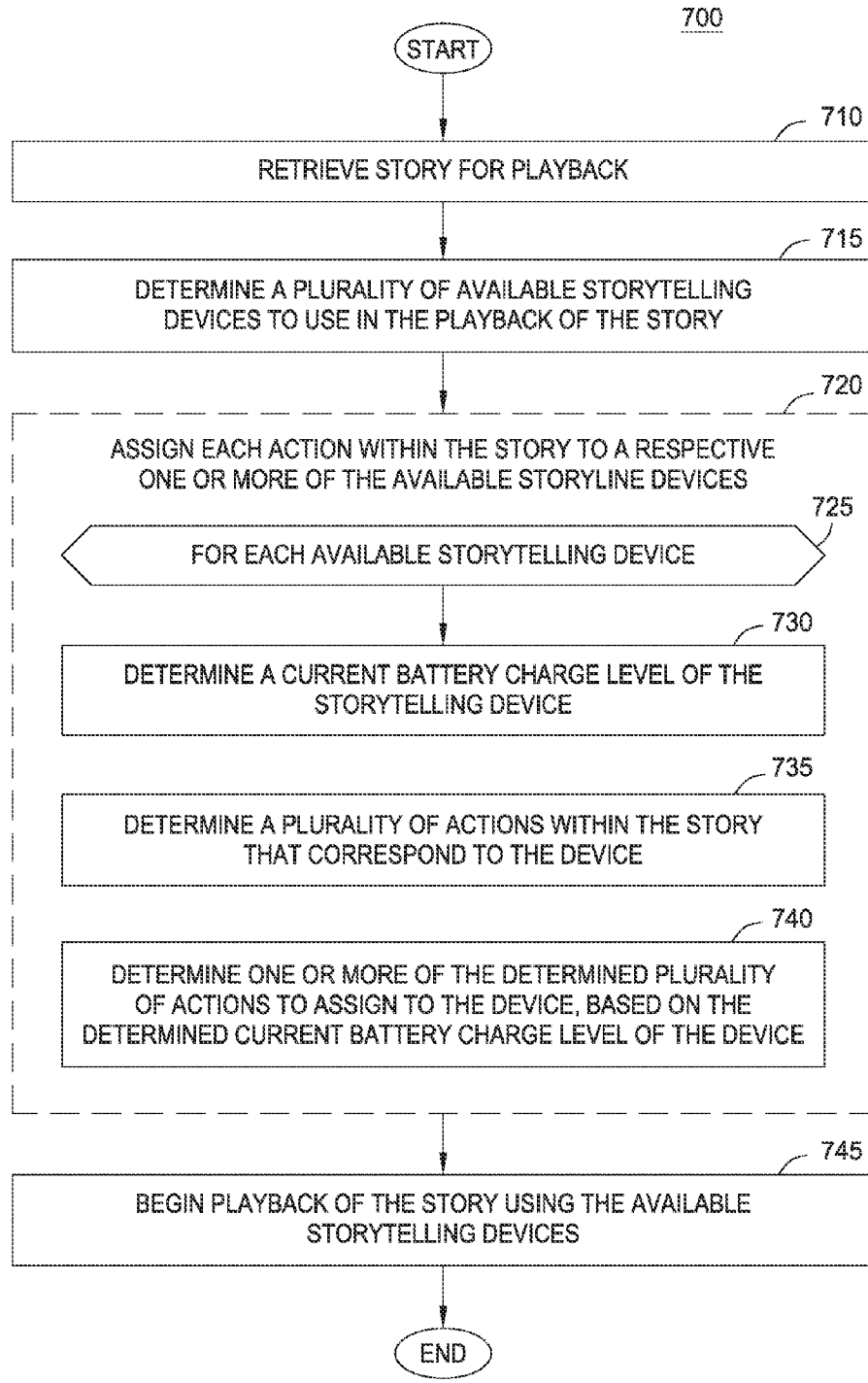
FIG. 7 is a flow diagram illustrating a method for assigning story actions to devices based on battery charge information for the devices, according to one embodiment described herein.

FIG. 7 is a flow diagram illustrating a method for assigning story actions to devices based on battery charge information for the devices, according to one embodiment described herein. As shown, the method 700 begins at block 710, where a control component (e.g., controller 125, one of controller storytelling devices 240 and 260, etc.) retrieves a story for playback. As discussed above, the retrieved story can include numerous different actions to be performed by various storytelling devices and stimulus events that, when satisfied, indicate that a corresponding action is to be performed by an assigned storytelling device. The control component also determines a plurality of available storytelling devices for use in the playback of the retrieved story (block 715).

The control component then assigns each action within the story to a respective one or more of the available storytelling devices (block 720). In assigning the actions to the various available storytelling devices, the control component, for each available storytelling device (block 725), determines the current battery charge level of the respective storytelling device (block 730). For example, the control component could transmit a message (e.g., over a communications network such as radio frequency communications) to each storytelling device, requesting information on the current battery charge level of the respective device. Generally, any number of different techniques can be used to represent the current battery charge level of a device. For example, the current battery charge level could be represented using a numeric value indicating a current battery charge level out of a maximum battery charge level (e.g., a percentage value of battery charge). As another example, the current battery charge level could be represented by state information, such as low battery charge, medium battery charge at high battery charge. More generally, any suitable technique for representing the current level of battery charge for a device can be used, consistent with the functionality described herein.

Once the current battery charge level of the respective storytelling device is determined, the control component determines actions within the story that correspond to the storytelling device (block 735). As discussed above, the story could explicitly require that a particular storytelling device be used in performing the particular action. As another example, the story could specify a class of devices that may be used to perform the particular action (e.g., a "Hero" class of devices). As yet another example, the story could specify that any available storytelling device may be used in performing a particular action (e.g., the playback of ambient noise, the playback of an audio effect corresponding to a virtual character not represented by any of the physical storytelling devices, etc.).

The control component then determines one or more of the determined actions to assign to the respective storytelling device, based on the determined current battery charge level of the respective device (block 740). As discussed above, the control component can optimize the assignment of story actions to devices, such that the available storytelling devices have sufficient battery charge to complete the playback of the story. As an example, if a particular storytelling device has a relatively low battery charge level, the control component could assign fewer actions to be performed by the particular storytelling device, in order to conserve the already low battery charge level of the device. In such an example, the control component could still assign any actions that the story indicates must be performed by the particular storytelling device to the particular storytelling device, but could assign other actions for which a suitable storytelling device is present to another one of the determined storytelling devices. Doing so ensures that all of the storytelling devices have sufficient battery charge to complete the playback of the story. Once all of the actions have been assigned to at least one of the available storytelling devices, the control component initiates playback of the story using the available storytelling devices and the action assignments (block 745), and the method 700 ends.

As discussed above, the storytelling devices available for use in the playback of the story can change during the playback of the story. For example, a new storytelling device could become available when a child enters the physical environment in which the story playback is taking place (e.g., when a child visits a friend's house and brings one or more suitable storytelling devices). As another example, the storytelling device could become unavailable when the device leaves the physical environment (e.g., the child leaves the friend's house and takes the storytelling device) or due to a technical problem with the storytelling device (e.g., insufficient battery charge level). As such, the control component can dynamically re-perform the action assignments (block 720) during the playback of the story, upon detecting that the determined plurality of available storytelling devices has changed (i.e., an available device has become unavailable or a new storytelling device has become available). Doing so allows the storytelling environment to dynamically adapt, in real time to the storytelling devices available within the physical environment.

Additionally, as discussed above, certain actions within a story can be configurable, such that only a portion of the action can be performed or an alternate action can be performed instead. As such, in assigning the actions to the available storytelling devices, the control component can determine whether an alternate or modified action should be assigned to a particular storytelling device, based on the determined current battery charge level of the particular storytelling device. For example, if the story specifies that a particular action should be performed by a particular one of the storytelling devices, and the control component determines that the particular storytelling device does not have sufficient battery charge to perform the action or to complete the playback of the story if the action is performed, the control component could instead assign an alternate or modified action to the particular storytelling device. As an example, instead of assigning an action that includes both haptic feedback and audio content to be output by the particular storytelling device, the control component could simply assign the output of the audio content to the particular storytelling device. In one embodiment, the story includes information that indicates which portions of various actions are essential and which are nonessential, and the control component can use such information to determine which portions of an action can be omitted in the event the assigned device has a relatively low battery charge level.

As another example, the story could include an action that includes the output of lengthy audio data (e.g., audio data representing the voice of a story narrator), and further specify an alternate action that includes the output of much shorter audio data (e.g., audio data representing a condensed version of the story narration). Upon determining that a suitable storytelling device to perform the action does not have sufficient battery charge, the control component could assign the alternate action to the suitable storytelling device instead thereby conserving the battery charge of the device and allowing the storytelling device to complete the playback of the story.

Technical Description

Figure 8:
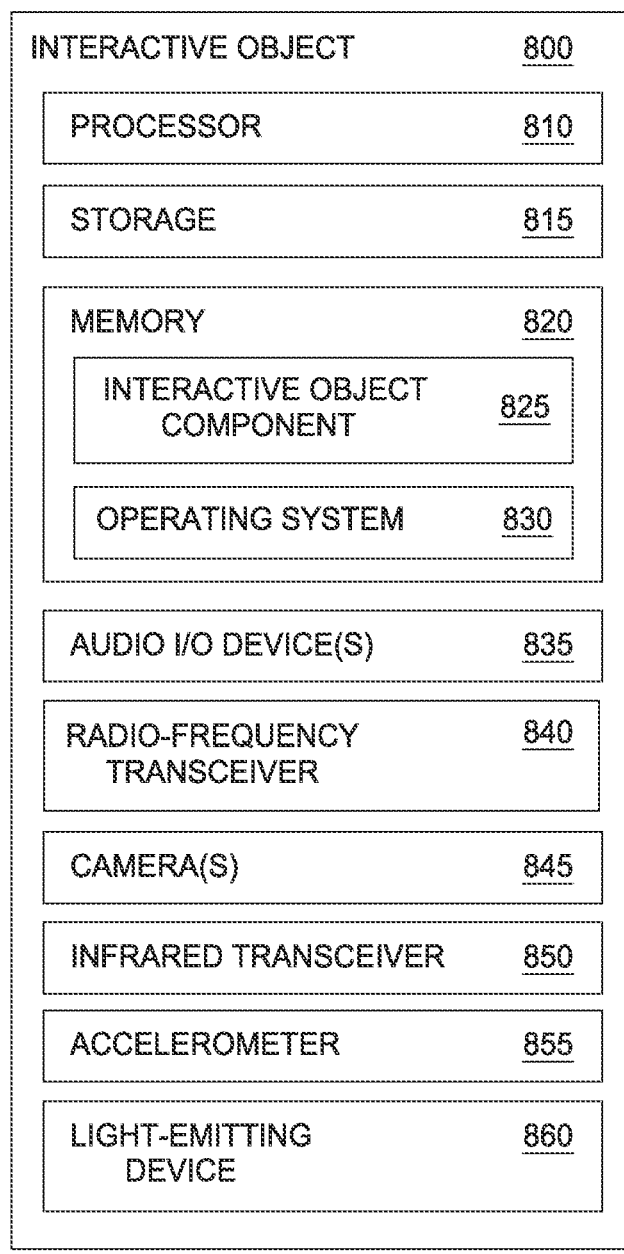
FIG. 8 is a block diagram illustrating an interactive object, according to one embodiment described herein.

An example of an interactive device is shown in FIG. 8, which is a block diagram illustrating an interactive device configured with an interactive object component, according to one embodiment described herein. In this example, the device 800 includes, without limitation, a processor 810, storage 815, memory 820, audio input/output (I/O) device(s) 835, a radio-frequency (RF) transceiver 840, a camera device(s) 845, an infrared transceiver 850, an accelerometer device 855, and a light-emitting device 860. Generally, the processor 810 retrieves and executes programming instructions stored in the memory 820. Processor 810 is included to be representative of a single CPU, multiple CPUs, a single CPU having multiple processing cores, GPUs having multiple execution paths, and the like. The memory 820 is generally included to be representative of a random access memory. The radio-frequency transceiver 840 enables the interactive object component 825 to connect to a data communications network (e.g., wired Ethernet connection or an 902.11 wireless network). As discussed above, the interactive device may include one or more battery devices (not shown).

Further, while the depicted embodiment illustrates the components of a particular interactive device, one of ordinary skill in the art will recognize that interactive devices may use a variety of different hardware architectures. For instance, in one embodiment the controller component logic is implemented as hardware logic. Examples of such hardware logic include, without limitation, an application-specific integrated circuit (ASIC) and a field-programmable gate array (FPGA). Moreover, it is explicitly contemplated that embodiments may be implemented using any device or computer system capable of performing the functions described herein.

Returning to the embodiment depicted in FIG. 8, the memory 820 represents any memory sufficiently large to hold the necessary programs and data structures. Memory 820 could be one or a combination of memory devices, including Random Access Memory, nonvolatile or backup memory (e.g., programmable or Flash memories, read-only memories, etc.). In addition, memory 820 and storage 815 may be considered to include memory physically located elsewhere; for example, on another computer communicatively coupled to the interactive device 800. Illustratively, the memory 820 includes an interactive object component 825 and an operating system 830. The interactive object component 825 could be configured to receive commands (e.g., encoded in RF or infrared signals) and to execute the commands to perform audiovisual effects. In one embodiment, the interactive object component 825 is configured to decrypt the commands using a received key before executing the commands. The operating system 830 generally controls the execution of application programs on the interactive device 800. Examples of operating system 830 include UNIX, a version of the Microsoft Windows® operating system, and distributions of the Linux® operating system. Additional examples of operating system 830 include custom operating systems for gaming consoles, including the custom operating systems for systems such as the Nintendo DS® and Sony PSP®.

The infrared transceiver 850 represents any device capable of sending and receiving infrared signals. In another embodiment, a device 800 that only sends or receives infrared signals may be configured with an infrared transmitter or a infrared receiver, respectively, as opposed to the infrared transceiver 850. The sound I/O devices 835 could include devices such as microphones and speakers. For example, the speakers could be used to produce sound effects (e.g., explosion sound effects, dialogue, etc.) and/or to produce vibration effects.

Generally, the interactive object component 825 provides logic for the interactive device 800. For example, the interactive object component 825 could be configured to detect that a coded infrared signal has been received (e.g., using the infrared transceiver 850). The interactive object component 825 could then determine a type of the infrared signal (e.g., based on data specified within the coded infrared signal) and could determine a corresponding response based on determined type. For example, the interactive object component 825 could determine that the infrared signal specifies that a repulsor ray blast sound effect should be played, and, in response, could output the specified sound effect using audio I/O devices 835. As another example, the signal could be encoded with data specifying that a particular lighting effect should be displayed according to a specified schedule (e.g., at a particular point in time), and the interactive object component 825 could monitor the schedule (e.g., using an internal clock) and could activate the appropriate light-emitting device 860 at the appropriate time.

Figure 9:
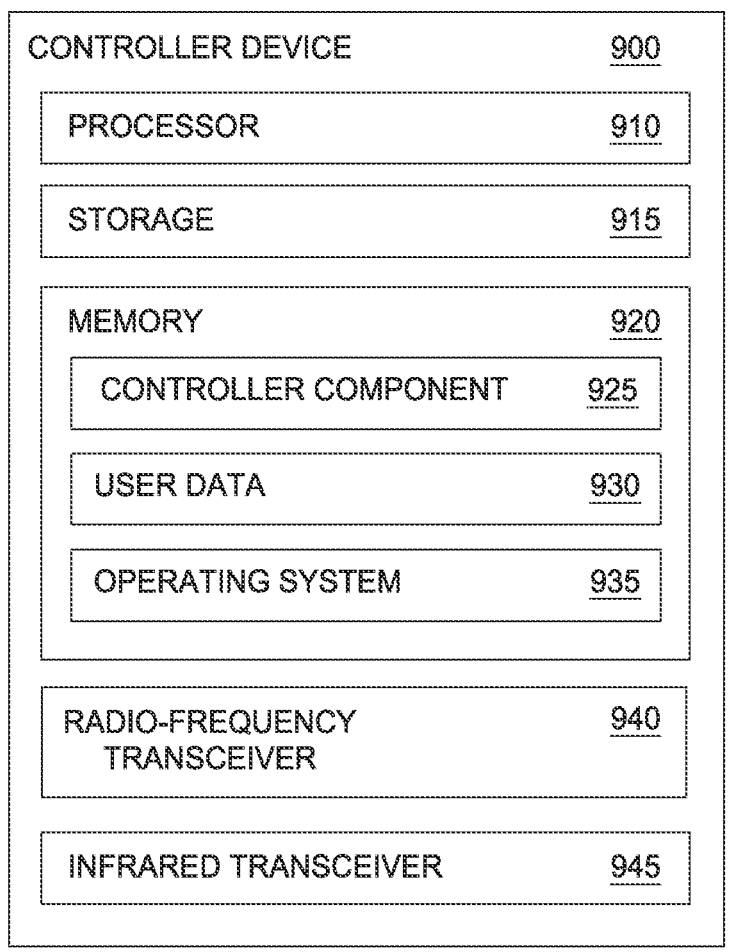
FIG. 9 is a block diagram illustrating a controller device, according to one embodiment described herein.

FIG. 9 illustrates an example of a controller device, according to one embodiment described herein. As shown, the controller 900 includes a processor 910, storage 915, memory 920, a radio-frequency transceiver 940 and an infrared transceiver 945. Generally, the processor 910 retrieves and executes programming instructions stored in the memory 920. Processor 910 is included to be representative of a single CPU, multiple CPUs, a single CPU having multiple processing cores, GPUs having multiple execution paths, and the like. The memory 920 is generally included to be representative of a random access memory. The radio-frequency transceiver 940 enables the controller device 900 to transmit and receive radio-frequency signals. Likewise, the infrared transceiver 945 allows the device 900 to transmit and receive infrared signals. Further, while the depicted embodiment illustrates the components of a particular controller device 900, one of ordinary skill in the art will recognize that interactive objects may use a variety of different hardware architectures. Moreover, it is explicitly contemplated that embodiments may be implemented using any device or computer system capable of performing the functions described herein.

The memory 920 represents any memory sufficiently large to hold the necessary programs and data structures. Memory 920 could be one or a combination of memory devices, including Random Access Memory, nonvolatile or backup memory (e.g., programmable or Flash memories, read-only memories, etc.). In addition, memory 920 and storage 915 may be considered to include memory physically located elsewhere; for example, on another computer communicatively coupled to the controller device 900. Illustratively, the memory 920 includes a controller component 925, user data 930 and an operating system 935. The operating system 935 generally controls the execution of application programs on the controller device 900. Examples of operating system 935 include UNIX, a version of the Microsoft Windows® operating system, and distributions of the Linux® operating system. Additional examples of operating system 935 include custom operating systems for gaming consoles, including the custom operating systems for systems such as the Nintendo DS® and Sony PSP®.

Generally, the controller component 925 configures the interactive objects (e.g., toys 110, 115 and 120, or an action disc device 200) to perform particular actions. The particular actions can also be based on the user data 930 (e.g., historical interactions data between the user and various interactive objects, user preferences data, etc.) and one or more environmental factor (e.g., a room of the house the object is currently in, a time of day, a day of the week, etc.). For instance, in one embodiment, the controller component 925 is configured with logic for recognizing particular events and broadcasting commands for the devices to perform a corresponding action(s) in response. In such an embodiment, the controller component 925 could use input/output devices (e.g., cameras, microphones, wireless transceivers, infrared sensors, etc.) to detect when a particular event occurs. For instance, the controller component 925 could use a camera to detect when a particular projection appears, and could then broadcast a command (e.g., using a RF signal) instructing the devices to perform a corresponding action in response. As another example, the controller component 925 could receive a wireless signal (e.g., an RF signal, data communicated using Bluetooth communications, etc.) from another one of the devices, indicating that a particular action has been performed. The device could then broadcast a signal instructing one or more other devices to perform a corresponding action responsive to receiving the signal.

In a particular embodiment, the controller component 925 is configured to control the actions of multiple devices to cause the devices to perform audiovisual effects synchronously. For instance, the controller component 925 could broadcast a message to the devices, instructing the devices to perform a particular audiovisual effect immediately upon receiving the message. As another example, the controller component 925 could broadcast a message to the devices, instructing the devices to perform actions (e.g., play a sound effect, trigger a lighting effect, etc.) according to a schedule. Here, the devices may maintain internal clocks that are synchronized with one another for use in synchronously performing the audiovisual actions.

As discussed above, the controller component 925 can be configured to dynamically alter the playback of a particular story to optimize power consumption and battery life of all the interactive devices used in the playback of the story. Such alterations can include, without limitation, selecting various storyline arcs, altering the actions performed by the various devices, assigning actions to be performed as part of the story to one device over another, and so on. Doing so ensures that all of the interactive devices have sufficient battery power to complete the playback of the story.

Generally speaking, the devices and the controller 900 may be implemented in any number of different ways, consistent with the present disclosure. With respect to hardware, embodiments may employ a modular design for maximum hardware reusability across different interactive objects. Such a design could include, for instance, hardware adapters that allow common processors, memories and buses to receive and send data via a multiplicity of sensors, displays, effectors and other means of communication. Additionally, system and/or operating system agnostic sites (e.g., Portals) could be used to ensure maximum compatibility for all users.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A non-transitory computer-readable medium containing computer program code, that, when executed, performs an operation comprising:
    retrieving a story for playback, the story comprising a plurality of actions and, for each of the plurality of actions, stimulus criteria indicating when the respective action is to be performed;
    determining a plurality of available storytelling devices for use in playback of the story;
    assigning each of the plurality of actions within the story to a respective one or more of the plurality of available storytelling devices, based at least in part on a respective indication of battery charge for the respective storytelling device; and
    initiating playback of the story using, for each of the plurality of actions, the assigned one or more available storytelling devices to perform the respective action, responsive to a determination that the corresponding stimulus criteria is satisfied.

2. The non-transitory computer-readable medium of claim 1, wherein the story further comprises a designation of device class for a first action of the plurality of actions, wherein the designation of device class indicates a class of storytelling device to which the first action can be assigned.

3. The non-transitory computer-readable medium of claim 2, wherein assigning each of the plurality of actions within the story to the respective one or more of the plurality of available storytelling devices further comprises:
    assigning the first action to one or more available storytelling devices, based on the designation of device class matching a determined class of the one or more available storytelling devices.

4. The non-transitory computer-readable medium of claim 1, the operation further comprising:
    determining, for each of the plurality of available storytelling devices, the respective indication of battery charge.

5. The non-transitory computer-readable medium of claim 4, wherein determining, for each of the plurality of available storytelling devices, the respective indication of battery charge further comprises:
    responsive to transmitting a request over a first communications network to at least one of the plurality of available storytelling devices, receiving the respective indication of battery charge for each of the plurality of available storytelling device.

6. The non-transitory computer-readable medium of claim 1, wherein determining a plurality of available storytelling devices for use in playback of the story further comprises:
    determining a plurality of storytelling devices within an immediate physical environment;
    determining a first playgroup to which a controller device belongs; and
    upon determining, for each of the plurality of storytelling devices, that the respective storytelling device is a member of the first playgroup, determining that the respective storytelling device is an available storytelling device for use in the playback of the story.

7. The non-transitory computer-readable medium of claim 6, wherein determining that the respective storytelling device is an available storytelling device for use in the playback of the story is further based on a determination that the respective storytelling device has at least a threshold level of battery charge.

8. The non-transitory computer-readable medium of claim 1, the operation further comprising:
   determining that a first event has occurred when a new storytelling device becomes available for use in playback of the story;
   determining that a second event has occurred when one of the plurality of available storytelling devices becomes unavailable for use in playback of the story; and
   upon determining that at least one of the first event and the second event has occurred during the playback of the story:
      determining an updated plurality of available storytelling devices for use in playback of the story;
      re-assigning each remaining action in the plurality of actions to a respective one or more of the updated plurality of available storytelling devices, based at least in part on a respective indication of battery charge for the respective storytelling device; and
      resuming playback of the story using, for each remaining action in the plurality of actions, the re-assigned one or more available storytelling devices to perform the respective action, responsive to a determination that the corresponding stimulus criteria is satisfied.

9. The non-transitory computer-readable medium of claim 1, wherein assigning each of the plurality of actions within the story to the respective one or more of the plurality of available storytelling devices further comprises:
   upon determining to assign a first action of the plurality of actions to a first available storytelling device of the plurality of available storytelling devices, and further upon determining that the first available storytelling device has less than a threshold level of battery charge:
      determining an alternative action specified within the story and corresponding to the first action; and
      assigning the determined alternative action to the first available storytelling device, rather than the first action, wherein the first available storytelling device performs the determined alternative action responsive to a determination that the corresponding stimulus criteria is satisfied.

10. The non-transitory computer-readable medium of claim 1, wherein assigning each of the plurality of actions within the story to the respective one or more of the plurality of available storytelling devices further comprises:
   upon determining to assign a first action of the plurality of actions to a first available storytelling device of the plurality of available storytelling devices, and further upon determining that the first available storytelling device has less than a threshold level of battery charge:
      determining a modified version of the first action, wherein the first action includes a plurality of sub-actions and wherein the modified version of the first action includes only a portion of the plurality of sub-actions; and
      assigning the determined modified version of the first action to the first available storytelling device, rather than the first action, wherein the first available storytelling device performs the determined modified version of the first action responsive to a determination that the corresponding stimulus criteria is satisfied.

11. The non-transitory computer-readable medium of claim 1, wherein assigning each of the plurality of actions within the story to the respective one or more of the plurality of available storytelling devices further comprises:
   upon determining to assign a first action of the plurality of actions to a first available storytelling device of the plurality of available storytelling devices, and further upon determining that the first available storytelling device has less than a threshold level of battery charge:
      determining at least one of (i) an alternative action specified within the story and corresponding to the first action and (ii) a modified version of the first action, wherein the first action includes a plurality of sub-actions, and wherein the modified version of the first action includes only a portion of the plurality of sub-actions; and
      assigning at least one of the determined alternative action and the determined modified version of the first action to the first available storytelling device, rather than the first action, wherein the first available storytelling device performs at least one of the determined alternative action and the modified version of the first action, responsive to a determination that the corresponding stimulus criteria is satisfied.

12. A storytelling device, comprising:
   a processor; and
   a memory containing an audio effect and a program that, when executed by the processor, performs an operation comprising:
      retrieving a story for playback, the story comprising a plurality of actions and, for each of the plurality of actions, stimulus criteria indicating when the respective action is to be performed;
      determining a plurality of available storytelling devices for use in playback of the story;
      assigning each of the plurality of actions within the story to a respective one or more of the plurality of available storytelling devices, based at least in part on a respective indication of battery charge for the respective storytelling device; and
      initiating playback of the story using, for each of the plurality of actions, the assigned one or more available storytelling devices to perform the respective action, responsive to a determination that the corresponding stimulus criteria is satisfied.

13. The storytelling device of claim 12, wherein the story further comprises a designation of device class for a first action of the plurality of actions, wherein the designation of device class indicates a class of storytelling device to which the first action can be assigned.

14. The storytelling device of claim 13, wherein assigning each of the plurality of actions within the story to the respective one or more of the plurality of available storytelling devices further comprises:
   assigning the first action to one or more available storytelling devices, based on the designation of device class matching a determined class of the one or more available storytelling devices.

15. The storytelling device of claim 12, the operation further comprising:
   determining, for each of the plurality of available storytelling devices, the respective indication of battery charge.

16. The storytelling device of claim 15, wherein determining, for each of the plurality of available storytelling devices, the respective indication of battery charge further comprises:
responsive to transmitting a request over a first communications network to at least one of the plurality of available storytelling devices, receiving the respective indication of battery charge for each of the plurality of available storytelling device.

17. The storytelling device of claim 12, wherein determining a plurality of available storytelling devices for use in playback of the story further comprises:
determining a plurality of storytelling devices within an immediate physical environment;
determining a first playgroup to which a controller device belongs; and
upon determining, for each of the plurality of storytelling devices, that the respective storytelling device is a member of the first playgroup, determining that the respective storytelling device is an available storytelling device for use in the playback of the story.

18. The storytelling device of claim 17, wherein determining that the respective storytelling device is an available storytelling device for use in the playback of the story is further based on a determination that the respective storytelling device has at least a threshold level of battery charge.

19. The storytelling device of claim 12, the operation further comprising:
determining that a first event has occurred when a new storytelling device becomes available for use in playback of the story;
determining that a second event has occurred when one of the plurality of available storytelling devices becomes unavailable for use in playback of the story; and
upon determining that at least one of the first event and the second event has occurred during the playback of the story:
determining an updated plurality of available storytelling devices for use in playback of the story;
re-assigning each remaining action in the plurality of actions to a respective one or more of the updated plurality of available storytelling devices, based at least in part on a respective indication of battery charge for the respective storytelling device; and
resuming playback of the story using, for each remaining action in the plurality of actions, the re-assigned one or more available storytelling devices to perform the respective action, responsive to a determination that the corresponding stimulus criteria is satisfied.

20. A method, comprising:
retrieving a story for playback, the story comprising a plurality of actions and, for each of the plurality of actions, stimulus criteria indicating when the respective action is to be performed;
determining a plurality of available storytelling devices for use in playback of the story;
assigning, by operation of one or more computer processors, each of the plurality of actions within the story to a respective one or more of the plurality of available storytelling devices, based at least in part on a respective indication of battery charge for the respective storytelling device; and
initiating playback of the story using, for each of the plurality of actions, the assigned one or more available storytelling devices to perform the respective action, responsive to a determination that the corresponding stimulus criteria is satisfied.

* * * * *